US010976616B2

(12) United States Patent
Zhang et al.

(10) Patent No.: US 10,976,616 B2
(45) Date of Patent: Apr. 13, 2021

(54) DISPLAY PANEL, MANUFACTURING METHOD THEREOF AND DISPLAY DEVICE

(71) Applicants: Hefei Xinsheng Optoelectronics Technology Co., Ltd., Hefei (CN); BOE TECHNOLOGY GROUP CO., LTD., Beijing (CN)

(72) Inventors: Yisan Zhang, Beijing (CN); Quan Gan, Beijing (CN); Yongcan Wang, Beijing (CN); Wei Sun, Beijing (CN)

(73) Assignees: Hefei Xinsheng Optoelectronics Technology Co., Ltd., Hefei (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/451,449

(22) Filed: Jun. 25, 2019

(65) Prior Publication Data
US 2020/0073165 A1 Mar. 5, 2020

(30) Foreign Application Priority Data
Aug. 31, 2018 (CN) .......................... 201811010566.7

(51) Int. Cl.
*G02F 1/1339* (2006.01)
*G02F 1/1333* (2006.01)
(Continued)

(52) U.S. Cl.
CPC ........ *G02F 1/13394* (2013.01); *G02F 1/1341* (2013.01); *G02F 1/1368* (2013.01);
(Continued)

(58) Field of Classification Search
CPC .......... G02F 1/13394; G02F 1/133512; G02F 1/133514; G02F 1/133305; G02F 1/1341; G02F 1/1368; G02F 2001/133302
See application file for complete search history.

(56) References Cited

U.S. PATENT DOCUMENTS 10,268,083 B2 * 4/2019 Wang .................. G02F 1/13394
10,539,836 B2 * 1/2020 Xu ....................... H01L 27/1288
(Continued)

FOREIGN PATENT DOCUMENTS

CN          1940646 A      4/2007
CN        101373298 A      2/2009
(Continued)

OTHER PUBLICATIONS

First Office Action for CN Patent Application No. 201811010566.7 dated Sep. 25, 2020.

*Primary Examiner* — Dung T Nguyen
(74) *Attorney, Agent, or Firm* — Thomas Horstemeyer, LLP

(57) ABSTRACT

The present disclosure provides a display panel, a manufacturing method thereof, and a display device, where the display panel includes a first substrate, a second substrate, a first spacer, and a second spacer. The first substrate and the second substrate are disposed opposite to each other. The first spacer is disposed on a side of the first substrate adjacent to the second substrate. The second spacer is disposed on a side of the second substrate adjacent to the first substrate. The first spacer and the second spacer are butted with each other through one of two embeddings in the other.

20 Claims, 4 Drawing Sheets

(51) Int. Cl.
*G02F 1/1335* (2006.01)
*G02F 1/1341* (2006.01)
*G02F 1/1368* (2006.01)

(52) U.S. Cl.
CPC .. *G02F 1/133305* (2013.01); *G02F 1/133514* (2013.01); *G02F 1/13396* (2021.01); *G02F 1/133302* (2021.01)

(56) References Cited

U.S. PATENT DOCUMENTS

| | | | |
|---|---|---|---|
| 2005/0190316 A1* | 9/2005 | Takahashi | G02F 1/134363 349/44 |
| 2013/0335691 A1* | 12/2013 | Wu | G02F 1/1339 349/155 |
| 2016/0266432 A1* | 9/2016 | Tamatani | G02F 1/1339 |

FOREIGN PATENT DOCUMENTS

| | | |
|---|---|---|
| CN | 203084383 U | 7/2013 |
| CN | 103676335 A | 3/2014 |
| CN | 104460124 A | 3/2015 |
| CN | 104914607 A | 9/2015 |
| CN | 104932153 A | 9/2015 |
| CN | 105911774 A | 8/2016 |
| KR | 20100021021 A | 2/2010 |

* cited by examiner

DISPLAY PANEL, MANUFACTURING METHOD THEREOF AND DISPLAY DEVICE

CROSS-REFERENCE TO RELATED APPLICATION

This application is based upon, and claims the benefit of and priority to, Chinese Patent Application No. 201811010566.7, filed on Aug. 31, 2018, the entire contents thereof being incorporated herein by reference.

TECHNICAL FIELD

The present disclosure relates to the field of display technology and, particularly, to a display panel, a manufacturing method thereof, and a display device.

BACKGROUND

A Thin Film Transistor-Liquid Display (TFT-LCD) is formed by filling a liquid crystal between an array substrate and a color film substrate, and disposing the array substrate and the color film substrate to each other to form a cell. The thickness of the liquid crystal, further referred to as the thickness of a cell, would greatly affect a light regulation of the liquid crystal. In order to maintain uniformity of the thickness of the cell and the stability of the panel, a certain number of spacers are disposed between the array substrate and the color film substrate to ensure that the liquid crystal is in a relatively stable state, thereby ensuring display effect.

Generally, a spacer is a one having a columnar shape made of a polymer material, and two ends of the spacer with the columnar shape are respectively in contact with the array substrate and the color film substrate. In the related art, after the display panel is bent or pressed by an external force, a relative displacement between the spacer and a substrate easily occurs, and then the phenomenon of light leakage occurs, thereby resulting in poor display.

SUMMARY

According to an aspect of the present disclosure, various embodiments of the present disclosure provide a display panel including: a first substrate, a second substrate, a first spacer, and a second spacer. The first substrate and the second substrate are disposed opposite to each other. The first spacer is disposed on a side of the first substrate adjacent to the second substrate. The second spacer is disposed on a side of the second substrate adjacent to the first substrate. The first spacer and the second spacer are butted with each other through one of the both embedding in the other.

According to an embodiment of the present disclosure, the first spacer includes at least one first component, and the second spacer includes at least one second component. The first component and the second component are butted with each other through one of the both embedding in the other.

According to an embodiment of the present disclosure, the first component is designed as a component with the columnar shape, and the second component includes the two adjacent sub-components with the columnar shape. The first component is embedded between the two sub-components.

According to an embodiment of the present disclosure, cross sections of the first component and the sub-component perpendicular to the first substrate are all rectangular.

According to an embodiment of the present disclosure, the second component is designed as a component with a columnar shape, and the first component includes two adjacent sub-components with the columnar shape. The second component is embedded between the two sub-components.

According to an embodiment of the present disclosure, the first spacer and the second spacer both include at least one first component and at least one second component. The first component disposed on the first substrate and the second component disposed on the second substrate are butted with each other through one of the both embedding in the other. The second component disposed on the first substrate and the first component disposed on the second substrate are butted with each other through one of the both embedding in the other.

According to an embodiment of the present disclosure, materials of the first component and the second component include an organic resin.

According to an embodiment of the present disclosure, the first substrate is an array substrate, and the second substrate is a color film substrate, or, the first substrate is the color film substrate, and the second substrate is the array substrate.

According to an embodiment of the present disclosure, a thickness of the first spacer is in the range of 2.0 um to 4.0 um, and the thickness of the second spacer is in the range of 2.0 um to 4.0 um.

According to another aspect of the present disclosure, the embodiment of the present disclosure provides a display device including a display panel, wherein the display panel includes a first substrate, a second substrate, a first spacer, and a second spacer. The first substrate and the second substrate are disposed opposite to each other. The first spacer is disposed on a side of the first substrate adjacent to the second substrate. The second spacer is disposed on a side of the second substrate adjacent to the first substrate. The first spacer and the second spacer are butted with each other through one of the both embedding in the other.

According to still another embodiment of the present disclosure, the embodiment of the present disclosure provides a manufacturing method of a display panel including:
    forming a first substrate;
    forming a first spacer on the first substrate;
    forming a second substrate;
    forming a second spacer on the second substrate; and
    disposing the first substrate provided with the first spacer and the second substrate provided with the second spacer opposite to each other to form a cell, wherein the first spacer and the second spacer are butted through one of the both embedding in the other.

According to an embodiment of the present disclosure, the forming the first substrate includes:
    providing a first glass substrate;
    forming a first flexible substrate on the first glass substrate; and
    forming a thin film transistor layer on the first flexible substrate to form the first substrate.

According to an embodiment of the present disclosure, the forming a second substrate includes:
    providing a second glass substrate;
    forming a second flexible substrate on the first glass substrate; and
    forming a color film layer on the first flexible substrate to form the second substrate.

According to an embodiment of the present disclosure, the forming the first spacer on the first substrate includes:
    coating a spacer material on the first substrate; and
    forming the first spacer by the spacer material through an exposure and development process.

According to an embodiment of the present disclosure, the forming the second spacer on the second substrate includes:

coating the spacer material on the second substrate; and forming the second spacer by the spacer material through the exposure and development process.

According to an embodiment of the present disclosure, after disposing the first substrate provided with the first spacer and the second substrate provided with the second spacer opposite to each other to form a cell, the method further includes: injecting a liquid crystal between the first substrate and the second substrate, and sealing with a sealant.

According to an embodiment of the present disclosure, after disposing the first substrate provided with the first spacer and the second substrate provided with the second spacer opposite to each other to form a cell, the method further includes: peeling off the first glass substrate and the second glass substrate by a laser process.

Other features and advantages of the present disclosure will be described in the subsequent description, and become apparent in part from the specification, or known by implementing embodiments of the disclosure. Objects and other advantages of the present disclosure can be realized and obtained by structures particularly pointed out in the specifications, claims, and accompanying drawings.

BRIEF DESCRIPTION OF THE DRAWINGS

The accompanying drawings are used to provide a further understanding of technical solutions of the present disclosure, constitute a part of the specification, and explain the technical solutions of the present disclosure together with the embodiments of the present application, and do not constitute a limitation of the technical solutions of the present disclosure.

DETAILED DESCRIPTION

In order to make the objects, the technical solutions, and the advantages of the present disclosure more clear, the embodiments of the present disclosure will be described in detail below with reference to the accompanying drawings. It should be noted that, in the case of no conflict, the embodiments in the present disclosure and the features in the embodiments may be arbitrarily combined with each other.

Steps illustrated in a flow chart may be executed in such as a computer system provided with a set of computer executable instructions. Further, although logical sequences are shown in the flow chart, in some cases the steps shown or described may be performed in a different order than the order described herein.

Unless otherwise defined, technical terms or scientific terms used in the embodiments of the present disclosure should be understood in ordinary meanings of those ordinary skilled in the art. The terms "first", "second", and similar terms used in the embodiments of the present disclosure, do not denote any order, quantity, or importance, but are merely used to distinguish different components. The terms "comprise" or "include" etc., and the similar terms mean that elements or items that are provided before the terms include the elements or the items that are provided after the terms and its equivalent, and does not exclude other elements or items. The terms "connect" or "joint" etc., and the similar terms are not limited to physical or mechanical connections, but may include electrical connections, whether direct or indirect. "Upper", "lower", "left", "right", etc., are only used to indicate a relative positional relationship, and when an absolute position of the object being described is changed, the relative positional relationship may also be changed accordingly.

Figure 1:
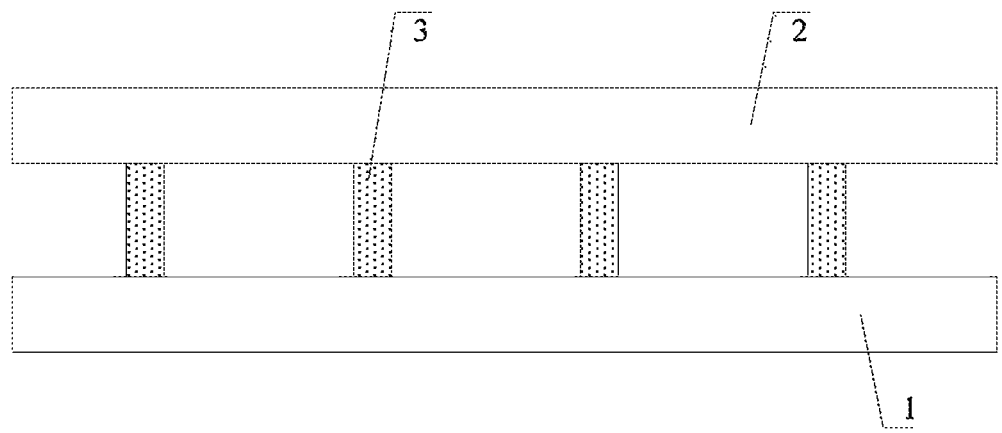
FIG. 1 a schematic diagram of structure of a display panel in the related art.

FIG. 1 a schematic diagram of structure of a display panel in the related art. As shown in FIG. 1, the display panel includes an array substrate 1, a color film substrate 2, and a spacer 3 which is in contact with the substrate 1 and the color film substrate 2.

Figure 2:
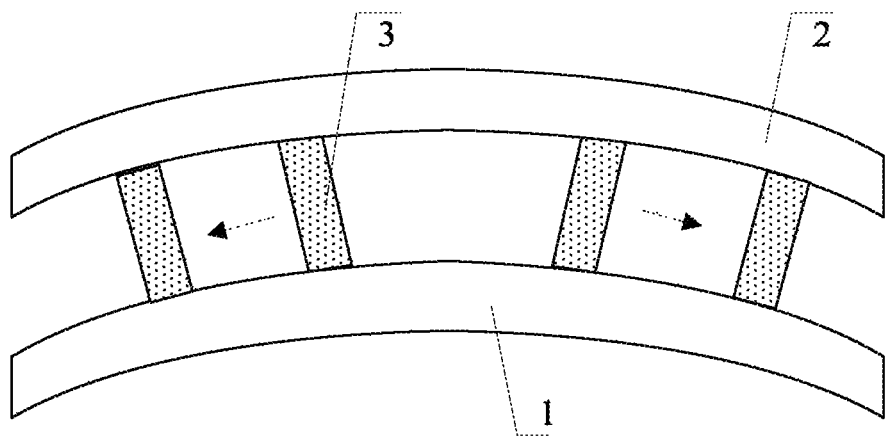
FIG. 2 is a schematic diagram of a bended structure of the display panel provided by FIG. 1.

FIG. 2 is a schematic diagram of a bended structure of the display panel provided by FIG. 1. As shown in FIG. 2, after the display panel is pressed, a displacement may occur between the spacer and the array substrate 1, or between the spacer 3 and the color film substrate 2. A relative movement of the spacer 3 causes an alignment layer (which is generally made of polyimide material) on a glass surface to be broken or scratched, thereby causing light leakage and reducing a display effect of the display panel.

In order to solve the above technical problem, an embodiment of the present disclosure provides a display panel, a manufacturing method thereof, and a display device. The specific descriptions are as follows.

Embodiment 1

Figure 3:
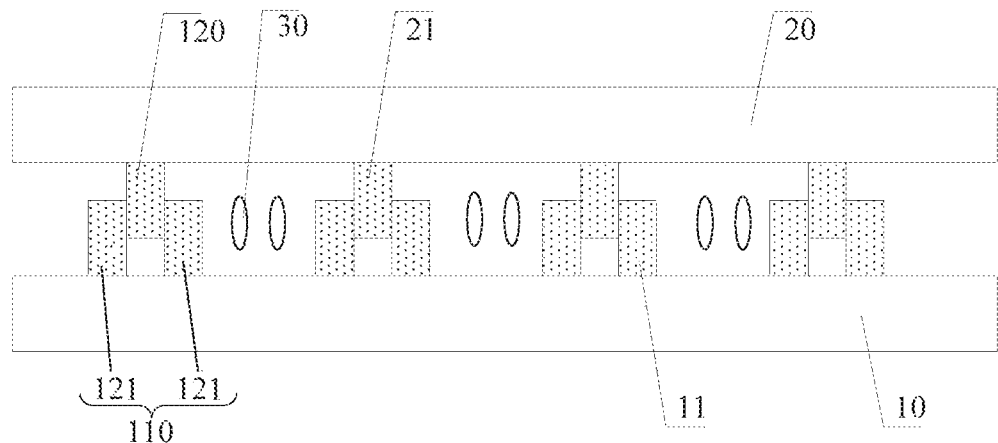
FIG. 3 is a schematic diagram 1 of structure of a display panel provided by an embodiment of the present disclosure.

FIG. 3 is a schematic diagram 1 of structure of a display panel provided by an embodiment of the present disclosure. As shown in FIG. 3, the display panel provided by the embodiment of the present disclosure includes a first substrate 10 and a second substrate 20 which are disposed opposite to each other. A first spacer 11 is disposed on a side of the first substrate 10 adjacent to the second substrate 20, and a second spacer 21 is disposed on a side of the second substrate 20 adjacent to the first substrate 10. In one embodiment, the first spacer 11 and the second spacer 21 are butted with each other through one of the both embedding in the other.

Specifically, as shown in FIG. 3, the display panel provided by the embodiment of the present disclosure further includes a liquid crystal 30 disposed between the first substrate 10 and the second substrate 20, and sealed with a sealant (which is not shown in the figures).

In the embodiment, the first substrate 10 is an array substrate, and the second substrate 20 is a color film substrate. Alternatively, the first substrate 10 is the color film substrate, and the second substrate 20 is the array substrate.

The embodiment of the present disclosure can form a stable structure by the first spacer 11 and the second spacer 21 abutting each other, where the first spacer 11 and the second space are each embedded in the other.

The display panel provided by the embodiment of the present disclosure includes a first substrate and a second substrate which are disposed opposite to each other. A first spacer is disposed on the side of the first substrate adjacent to the second substrate, and a second spacer is disposed on the side of the second substrate adjacent to the first substrate. The first spacer and the second spacer are butted through one an embedding in the other. In one embodiment of the present disclosure, the butted spacers of which one is embedded in the other are disposed on the first substrate and the second substrate, respectively, and a stable structure is formed by the butted spacers of which one is embedded in the other, ensuring that when the display panel is bent or squeezed by an external force, a relative displacement between the spacer and the substrate is reduced, and a light leakage phenomenon is avoided, and the display effect is improved.

Figure 4:
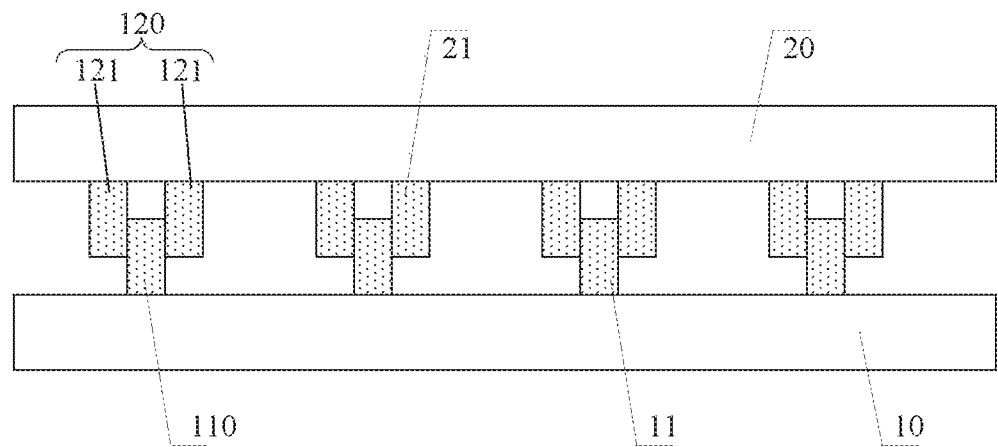
FIG. 4 is a schematic diagram 2 of structure of a display panel provided by an embodiment of the present disclosure.

FIG. 4 is a schematic diagram 2 of structure of a display panel provided by an embodiment of the present disclosure. As shown in FIG. 3 and FIG. 4, the first spacer 11 in the display panel provided by the embodiment of the present disclosure includes at least one first component 110. The second spacer 21 includes at least one second component 120. The first component 110 and the second component 120 are abutted through an embedding in the other.

According to an embodiment of the present disclosure, the first component 110 may be designed as a columnar shape. The second component 120 includes two adjacent sub-components 121 with the columnar shape. The first component 110 is embedded between the two sub-components. In one embodiment, the second component 120 may further be designed as a columnar structure provided with a groove in which the first component 110 is embedded.

According to an embodiment of the present disclosure, the second component 120 may be designed as the columnar shape. The first component 110 includes two adjacent sub-components 121 with the columnar shape. The second component 120 is embedded between the two sub-components. In one embodiment, the first component 110 may further be designed as a columnar structure provided with a groove in which the second component 120 is embedded.

It should be noted that, in FIG. 3, the second component 120 is designed as having the columnar shape, and the first component includes the two adjacent columnar sub-components 121 as an example. FIG. 4 is taken that the first component 110 is designed as the columnar shape, and the second component 120 includes the two adjacent columnar sub-components 121 as an example.

According to an embodiment of the present disclosure, the columnar shape may be a circular column shape or a square column shape.

Figure 5:
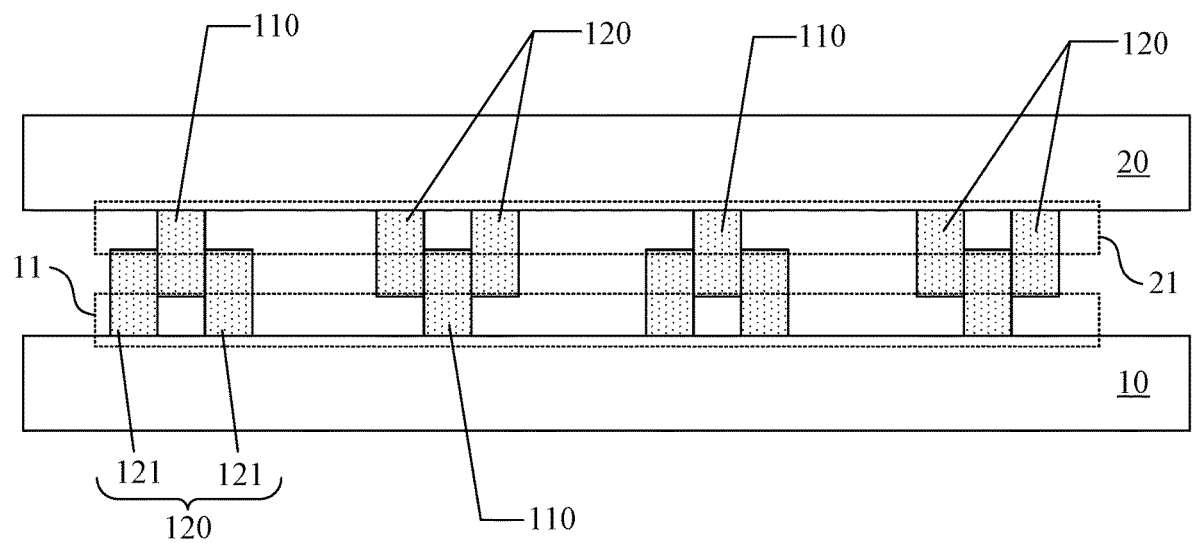
FIG. 5 is a schematic diagram 3 of structure of a display panel provided by an embodiment of the present disclosure.
Figure 6:
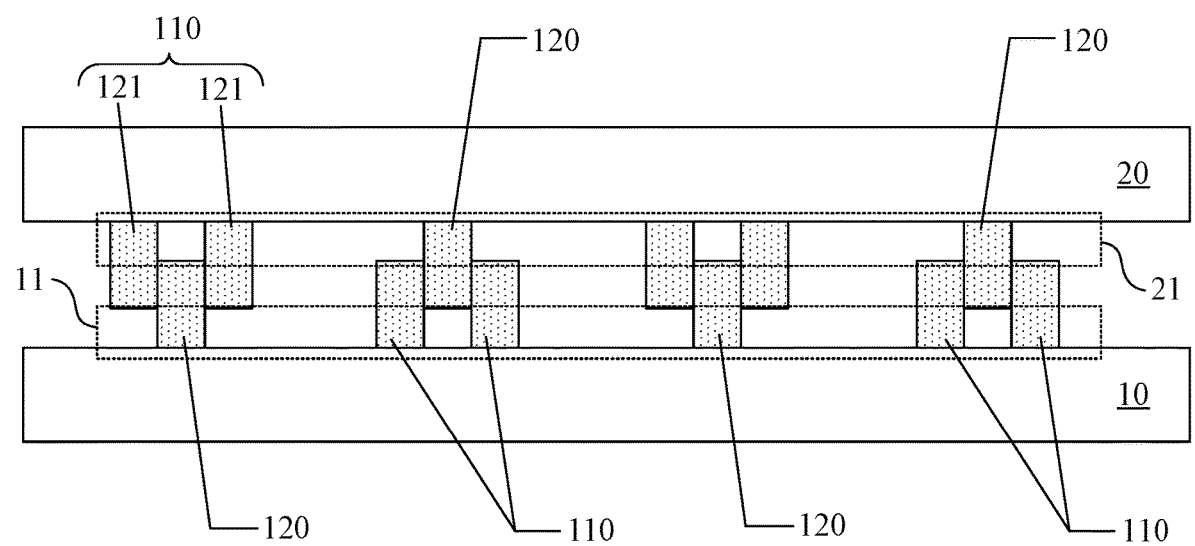
FIG. 6 is a schematic diagram 4 of structure of a display panel provided by an embodiment of the present disclosure.

According to an embodiment of the present disclosure, as an embodiment, FIG. 5 is a schematic diagram 3 of structure of a display panel provided by an embodiment of the present disclosure, and FIG. 6 is a schematic diagram 4 of structure of a display panel provided by an embodiment of the present disclosure. As shown in FIG. 5 and FIG. 6, the first spacer 11 and the second spacer 21 in the display panel provided by the embodiment of the present disclosure both include at least one first component 110 and at least one second component 120. The first component 110 provided on the first substrate 10 and the second component 120 provided on the second substrate 20 are abutted through any one of or both of an embedding in the other. The second component 120 provided on the first substrate 10 and the first component 110 provided on the second substrate 20 are abutted through any one of the embeddings in the other.

According to an embodiment of the present disclosure, as an embodiment, the first component 110 is designed as the columnar shape. The second component 120 includes two adjacent sub-components 121 with the columnar shape. The first component 110 is embedded between the two sub-components 121. In one embodiment, the second component 120 may further be designed as the columnar structure provided with a groove in which the first component is embedded.

According to an embodiment of the present disclosure, as an embodiment, the second component 120 is designed as the columnar shape. The first component 110 includes two adjacent sub-components 121 with the columnar shape. The second component 120 is embedded between the two sub-components 121. In one embodiment, the first component 110 may further be designed as a columnar structure provided with the groove in which the second component 120 is embedded.

It should be noted that FIG. 5 is taken that the first component 110 is designed as the columnar shape, and the second component 120 includes two adjacent columnar sub-components with the columnar shape as an example. FIG. 6 is taken that the second component 120 is designed as the columnar shape, and the first component 110 includes two adjacent columnar sub-components the columnar shape as the example.

According to an embodiment of the present disclosure, the columnar shape may be a circular column shape or a square column shape.

According to an embodiment of the present disclosure, materials of the first component 110 and the second component 120 may include an organic resin, which is not limited in the embodiment of the present disclosure.

According to an embodiment of the present disclosure, the organic resin includes a photoresist.

According to an embodiment of the present disclosure, the photoresist includes a positive photoresist or a negative photoresist.

According to an embodiment of the present disclosure, the thickness of the first spacer 11 is in the range of 2.0 um to 4.0 um. It should be noted that the embodiment of the present disclosure does not limit this range, and can be specifically determined according to an interval between the first substrate and the second substrate and the thickness of other film layers provided on the first substrate and the second substrate.

According to an embodiment of the present disclosure, the thickness of the second spacer 12 is in the range of 2.0 um to 4.0 um. It should be noted that the embodiment of the present disclosure does not limit this range, and can be specifically determined according to an interval between the first substrate and the second substrate and the thickness of other film layers provided on the first substrate and the second substrate.

Figure 7:
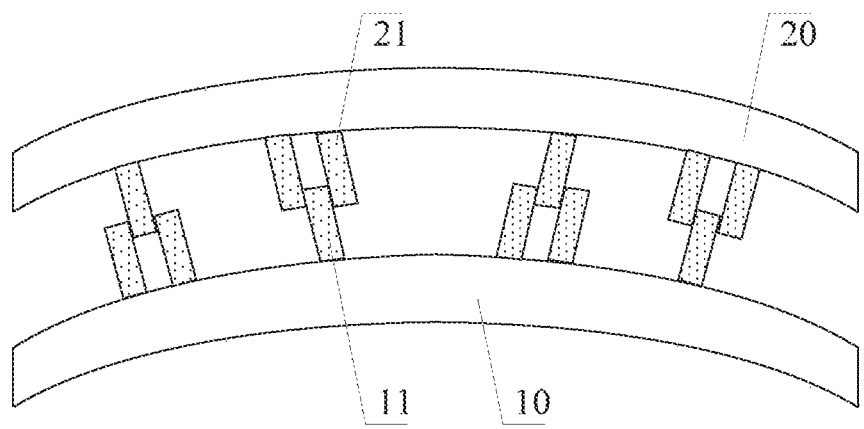
FIG. 7 is a schematic diagram of a bended structure of the display panel provided by FIG. 6.

FIG. 7 is a schematic diagram of a bended structure of the display panel provided by FIG. 6. As shown in FIG. 7, the first spacer and the second spacer of the display panel provided by the embodiment of the present disclosure are embedded with each other to form the stable structure. When the display panel is bent, the relative displacement between the spacers including first spacer and the second spacer and the substrates including the array substrate and the color film substrates will not occur. It should be noted that FIG. 7 only includes the display panel provided in FIG. 6, for example.

Embodiment 2

Figure 8:
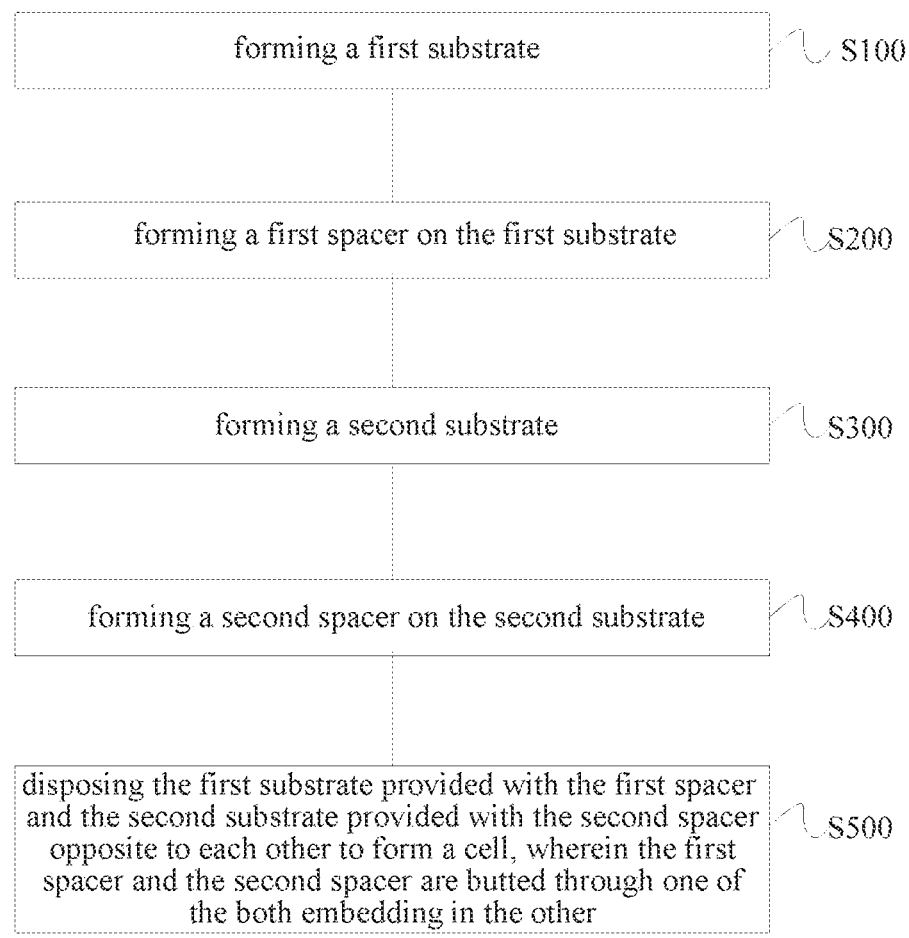
FIG. 8 is a flow chart of a manufacturing method of a display panel provided by an embodiment of the present disclosure.

Based on the disclosed concepts of the above embodiments, FIG. 8 is a flow chart of a manufacturing method of the display panel provided by an embodiment of the present disclosure. As shown in FIG. 8, the manufacturing method of the display panel provided by the embodiment of present disclosure specifically includes the following steps.

Step 100, the first substrate is formed.

In the embodiment, the step 100 specifically includes that a first glass substrate is provided. A first flexible substrate is formed on the first glass substrate, and a thin film transistor layer on the first flexible substrate is formed to form the first substrate.

Specifically, forming the thin film transistor layer on the first flexible substrate includes that a buffer layer, an active layer, a gate insulating layer, a gate electrode, an interlayer insulating layer, a source/drain electrode, and a passivation layer on the first flexible substrate are sequentially formed. It should be noted that the thin film transistor may be designed as a top gate structure or a bottom gate structure. The above-described formation of the thin film transistor layer is illustrated by taking the thin film transistor provided with the top gate structure as an example, which is not limited in the embodiment of the present disclosure.

According to an embodiment of the present disclosure, the material of the first flexible substrate is polyimide.

Step 200, the first spacer is formed on the first substrate.

In the embodiment, the step 200 specifically includes a spacer material being coated (for example, coated using spin coating) on the first substrate, and the first spacer being formed by the spacer material through an exposure and development process.

Specifically, after the spacer material is coated on the first substrate, the manufacturing method further includes the first substrate coated with the spacer material is vacuum-dried, specifically, vacuumed to remove excess solvents from the spacer material to obtain a first film layer. The first substrate on which the first film layer is formed is placed in an oven and pre-cured in an environment of 50 to 80 degrees Celsius. Forming the first spacer by the spacer material through an exposure and development process includes that the first film layer is exposed by a first mask layer, and the exposed first substrate is developed, and a part not irradiated with light is removed by development to obtain the first spacer.

According to an embodiment of the present disclosure, the spacer material includes the organic resin, and the organic resin includes a photoresist.

Step 300, the second substrate is formed.

In the embodiment, the step 300 specifically includes that a second glass substrate is provided. A second flexible substrate is formed on the second glass substrate, and a color film layer on the second flexible substrate is formed to form the second substrate.

According to an embodiment of the present disclosure, the material of the second flexible substrate is polyimide.

According to an embodiment of the present disclosure, the color film layer includes a filter layer arranged in an array, and a black matrix layer is provided between adjacent filter layers.

Step 400, the second spacer is formed on the second substrate.

In the embodiment, the step 400 specifically includes the spacer material being coated (for example, using spin coating) on the second substrate, and the second spacer being formed by the spacer material through the exposure and development process.

Specifically, after the spacer material is coated on the second substrate, the manufacturing method further includes the second substrate coated with the spacer material is vacuum-dried, specifically, vacuumed to remove excess solvents from the spacer material to obtain a second film layer. The second substrate on which the second film layer is formed is placed in the oven and pre-cured in the environment of 50 to 80 degrees Celsius. Forming the second spacer by the spacer material through the exposure and development process includes the second film layer being exposed by a second mask layer, and the exposed second substrate being developed, and the part not irradiated with light being removed by development to obtain the second spacer.

Step 500, the first substrate provided with the first spacer and the second substrate provided with the second spacer are disposed opposite to each other to form a cell.

Specifically, the first spacer and the second spacer are abutted and embedded with the other.

The manufacturing method of the display panel provided by the embodiment of the present disclosure includes the first substrate being formed, and the first spacer being formed on the first substrate. The second substrate is formed, and the second spacer is formed on the second substrate. The first substrate provided with the first spacer and the second substrate provided with the second spacer are disposed opposite to each other to form a cell. The first spacer and the second spacer are abutted through one of the two embeddings in the other. In one embodiment of the present disclosure, the butted spacers, of which one is embedded in the other, are disposed on the first substrate and the second substrate, respectively, and a stable structure is formed by the butted spacers of which one is embedded in the other, thereby ensuring that, when the display panel is bent or squeezed by the external force, the relative displacement between the spacer and the substrate is reduced, the light leakage phenomenon is avoided, and the display effect is improved.

According to an embodiment of the present disclosure, after step 500, the manufacturing method of the display panel provided by the embodiment of the present disclosure further includes the liquid crystal being injected between the first substrate and the second substrate, and being sealed with a sealant.

According to an embodiment of the present disclosure, after the liquid crystal is injected between the first substrate and the second substrate, and is sealed with a sealant, the manufacturing method of the display panel provided by the embodiment of the present disclosure further includes the first glass substrate and the second glass substrate being peeled off by a laser process to form a flexible display panel.

According to an embodiment of the present disclosure, the thickness of the first spacer is in the range of 2.0 um to 4.0 um. It should be noted that the embodiment of the present disclosure does not limit this range, and the thickness or the range can be specifically determined according to an interval between the first substrate and the second substrate and the thickness of other film layers provided on the first substrate and the second substrate.

According to an embodiment of the present disclosure, the thickness of the second spacer is in the range of 2.0 um to 4.0 um. It should be noted that the embodiment of the present disclosure does not limit this range, and the thickness or the range can be specifically determined according to an interval between the first substrate and the second substrate, and the thickness of other film layers provided on the first substrate and the second substrate.

Embodiment 3

Based on the disclosed concepts of the above embodiments, the embodiment of the present disclosure further provides a display device which includes the display panel provided in the embodiment 1.

Specifically, the display device may be any product or component having a display function, such as a mobile phone, a tablet computer, a television, a display, a notebook computer, a digital photo frame, a navigator, etc.

The accompanying drawings of the embodiments of the present disclosure only relate to structures involved in the embodiments of the present disclosure, and other structures may be referred to as a general design.

For the sake of clarity, in the figures used to describe the embodiments of the present disclosure, the thickness and the size of layers or microstructures are exaggerated. It will be understood that when an element such as a layer, a film, a region or a substrate is referred to as being located "on" or "lower" another element, the element may be "directly" located "above" or "below" another element, or may be provided with intermediate element.

In the case of no conflict, the embodiments of the present disclosure, that is, the features in the embodiments, may be combined with each other to obtain a new embodiment.

The embodiments disclosed in the present disclosure are as described above, but contents described are merely used to facilitate the understanding of the present disclosure, and are not intended to limit the present disclosure. Any modifications and variations in form and details of the embodiments may be made by those skilled in the art without departing from the spirit and scope of the disclosure. However, the scope of the present disclosure is still to be determined by the scope of the appended claims.

What is claimed is:

1. A display panel, comprising:
a first substrate;
a second substrate disposed opposite of the first substrate;
a first spacer disposed on a side surface of the first substrate adjacent to the second substrate, the first spacer comprising a first component and a second component of the first spacer; and
a second spacer disposed on a side surface of the second substrate adjacent to the first substrate, the second spacer comprising a first component and a second component of the second spacer, wherein the first spacer disposed on the first substrate is not in contact with the second substrate and the second spacer disposed on the second substrate is not in contact with the first substrate, wherein:
the first component of each of the first spacer and the second spacer has a columnar shape, and the second component of each of the first spacer and the second spacer comprises two sub-components adjacent to one another having the columnar shape, the first component of each of the first spacer and the second spacer being embedded between the two sub-components; or
the second component of each of the first spacer and the second spacer has a columnar shape, and the first component of each of the first spacer and the second spacer comprises two sub-components adjacent to one another having the columnar shape, the second component of each of the first spacer and the second spacer being embedded between the two sub-components.

2. The display panel according to claim 1, wherein cross sections of the first component and a respective one of the sub-components of at least one of the first spacer and the second spacer perpendicular to the first substrate are rectangular.

3. The display panel according to claim 1, wherein materials of the first component and the second component of at least one of the first spacer and the second spacer comprise an organic resin.

4. The display panel according to claim 3, wherein the organic resin comprises a photoresist.

5. The display device according to claim 4, wherein the photoresist comprises a positive photoresist.

6. The display device according to claim 4, wherein the photoresist comprises a negative photoresist.

7. The display panel according to claim 1, wherein:
the first substrate is an array substrate, and the second substrate is a color film substrate; or
the first substrate is the color film substrate, and the second substrate is the array substrate.

8. The display panel according to claim 1, wherein:
the thickness of the first spacer is in the range of 2.0 um to 4.0 um; and
the thickness of the second spacer is in the range of 2.0 um to 4.0 um.

9. The display panel according to claim 1, wherein:
the first component of each of the first spacer and the second spacer is one of a plurality of first components; and
the second component of each of the first spacer and the second spacer is one of a plurality of second components.

10. A display device comprising a display panel, the display panel comprising:
a first substrate;
a second substrate opposite to the first substrate;
a first spacer on a side surface of the first substrate adjacent to the second substrate, the first spacer comprising a first component and a second component of the first spacer; and
a second spacer on a side surface of the second substrate adjacent to the first substrate, the second spacer comprising a first component and a second component; of the second spacer, wherein the first spacer disposed on the first substrate is not in contact with the second substrate, and the second spacer disposed on the second substrate is not in contact with the first substrate, wherein:
the at least one first component of each of the first spacer and the second spacer has a columnar shape, and the second component of each of the first spacer and the second spacer comprises two sub-components adjacent to one another having the columnar shape, the first component of each of the first spacer and the second spacer being embedded between the two sub-components; or
the second component of each of the first spacer and the second spacer has a columnar shape, and the first component of each of the first spacer and the second spacer comprises two sub-components adjacent to one another having the columnar shape, the second component of each of the first spacer and the second spacer being embedded between the two sub-components.

11. The display device according to claim 10, wherein:
the first component of each of the first spacer and the second spacer is one of a plurality of first components; and
the second component of each of the first spacer and the second spacer is one of a plurality of second components.

12. The display device according to claim 10, wherein materials of the first component and the second component of at least one of the first spacer and the second spacer comprise an organic resin.

13. A method of manufacturing a display panel, comprising:
forming a first substrate;
forming a first spacer on the first substrate, the first spacer comprising a first component and a second component of the first spacer;
forming a second substrate;
forming a second spacer on the second substrate, the second spacer comprising at a first component and a second component of the first spacer, wherein the first spacer disposed on the first substrate is not in contact with the second substrate, and the second spacer disposed on the second substrate is not in contact with the first substrate; and
disposing the first substrate provided with the first spacer and the second substrate provided with the second spacer opposite to each other to form a cell, wherein:
the first component of each of the first spacer and the second spacer has a columnar shape, and the second component comprises two sub-components adjacent to one another having the columnar shape, the first component of each of the first spacer and the second spacer being embedded between the two sub-components; or
the second component of each of the first spacer and the second spacer has a columnar shape, and the first component of each of the first spacer and the second spacer comprises two sub-components that are adjacent to one another and have the columnar shape, the second component of each of the first spacer and the second spacer being embedded between the two sub-components.

14. The method according to claim 13, wherein forming the first substrate comprises:
providing a first glass substrate;
forming a first flexible substrate on the first glass substrate; and
forming a thin film transistor layer on the first flexible substrate to form the first substrate.

15. The method according to claim 14, wherein forming the second substrate comprises:
providing a second glass substrate;
forming a second flexible substrate on the first glass substrate; and
forming a color film layer on the first flexible substrate to form the second substrate.

16. The method according to claim 15, wherein, after disposing the first substrate provided with the first spacer and the second substrate provided with the second spacer opposite to each other to form a cell, the method further comprises: peeling off the first glass substrate and the second glass substrate using a laser process.

17. The method according to claim 13, wherein forming the first spacer on the first substrate comprises:
coating a spacer material on the first substrate; and
forming the first spacer by the spacer material through an exposure and development process.

18. The method according to claim 13, wherein forming the second spacer on the second substrate comprises:
coating the spacer material on the second substrate; and
forming the second spacer by the spacer material through the exposure and development process.

19. The method according to claim 13, wherein, after disposing the first substrate provided with the first spacer and the second substrate provided with the second spacer opposite to each other to form the cell, the method further comprises: injecting a liquid crystal between the first substrate and the second substrate, and sealing with a sealant.

20. The method according to claim 13, wherein:
the first component of each of the first spacer and the second spacer is one of a plurality of first components; and
the second component of each of the first spacer and the second spacer is one of a plurality of second components.

* * * * *